United States Patent
Geng

Patent Number: 6,064,423
Date of Patent: May 16, 2000

[54] METHOD AND APPARATUS FOR HIGH RESOLUTION THREE DIMENSIONAL DISPLAY

[76] Inventor: Zheng Jason Geng, 4950 Cloister Dr., Rockville, Md. 20852

[21] Appl. No.: 09/022,830

[22] Filed: Feb. 12, 1998

[51] Int. Cl.[7] .................................................. H04N 7/00
[52] U.S. Cl. .............................. 348/36; 348/37; 345/139; 345/32; 359/462
[58] Field of Search ................................. 348/36, 37, 39, 348/40, 42, 51, 78, 67; 345/6, 139, 32; 359/462, 326; 349/74; 73/606, 625; H04N 7/00

[56] References Cited

U.S. PATENT DOCUMENTS

| | | |
|---|---|---|
| 3,097,261 | 7/1963 | Schipper . |
| 3,140,415 | 7/1964 | Ketchpel . |
| 4,041,476 | 8/1977 | Swaison ................................. 340/173 |
| 4,130,832 | 12/1978 | Sher ........................................ 358/89 |
| 4,160,973 | 7/1979 | Berlin ..................................... 340/718 |
| 4,881,068 | 11/1989 | Korevaar ................................ 340/766 |
| 5,042,909 | 8/1991 | Garcia et al. .......................... 359/326 |
| 5,090,245 | 2/1992 | Anderson ................................ 73/625 |
| 5,148,310 | 9/1992 | Batchko ................................. 345/139 |
| 5,162,787 | 11/1992 | Thompson et al. ..................... 340/794 |
| 5,546,807 | 8/1996 | Oxaal et al. ............................ 73/606 |
| 5,684,621 | 11/1997 | Downing ................................ 359/326 |
| 5,703,606 | 12/1997 | Blundell .................................. 345/22 |
| 5,742,331 | 4/1998 | Uomori et al. ......................... 348/36 |
| 5,754,147 | 5/1998 | Tsao et al. .............................. 348/37 |
| 5,764,317 | 6/1998 | Sadovnik et al. ........................ 349/5 |

OTHER PUBLICATIONS

Helliwell (PC Week Sep. 25, 1989–1990, vol. 6, n. 38, p. 19).

*Primary Examiner*—Richard Lee
*Assistant Examiner*—Gims Philippe
*Attorney, Agent, or Firm*—Steven L. Nichols; Rader, Fishman & Grauer

[57] ABSTRACT

A process and system for displaying large (more than 1 million voxels) volumetric 3D images gives substantially higher resolution than is achievable with prior art techniques. The process and system utilize a sequence of helical slices of a 3D data set to generate a series of 2D images on a reflective surface of a light modulator. The series of 2D images generated on the light modulator are projected into a volumetric 3D-space display using an illumination light source and projection optics. Voxels in 3D space are illuminated for each 2D projected image, each voxel being located at its corresponding spatial location such that the 3D image thus generated can be viewed from any angle in a walkaround fish-tank manner without utilizing any viewing aids.

22 Claims, 9 Drawing Sheets

METHOD AND APPARATUS FOR HIGH RESOLUTION THREE DIMENSIONAL DISPLAY

BACKGROUND OF THE INVENTION

1. Field of Invention

This invention presents a method and apparatus for high-resolution volumetric three-dimensional (3D) display using fast spatial light modulators (SLM) and a moving image screen. By "volumetric 3D display", we mean that each "voxel" in the displayed 3D images locates physically at the (x, y, z) spatial position where it is supposed to be, and emits light from that position to form a real 3D images in the eyes of viewers. No special eyeglasses or viewing aids are needed. A group of viewers can see the displayed 3D images from different viewing angles simultaneously. Such volumetric 3D display devices are able to provide both physiological and psychological depth cues to viewers in perceiving and understanding the spatial relationship among 3D objects.

2. A Brief Survey of Prior Art on Volumetric 3D Display Techniques

In this section, we provide a brief survey of a number of 3D volumetric display techniques that have been intensively developed recently by several research groups.

Solid State Up-conversion

A fundamental requirement of a volumetric 3D display system is to have an entire volume filled with materials that can be selectively excited at any desired locations. To achieve this goal, one can have two independently controlled radiation beams which activate a voxel only when they intersect. While electron beams can not be used for such a purpose, laser beams can, provided that a suitable excitable material can be found. A process known as two-photon up-conversion can achieve this objective (U.S. Pat. No. 4,041476 by Swainson, 1977, U.S. Pat. No. 5,684,621 by Downing, 1997). Briefly, this process uses the energy of two IR photons to pump a material into an excited level from which it can make a visible fluorescent transition to a low level. For this process to be useful as a display medium it must exhibit two photon absorption from two different wavelengths so that a voxel is turned on only at the intersection of two independently scanned laser sources. The materials of choice at the present time are the rare earth metals doped into a glass host known as ZBLAN. ZBLAN is a flurozirconate glass whose chemical name stands for $ZrF_4$—$BaF_2$—$LaF_3$—$AlF_3$—$NaF$. The two photon up-conversion concept for 3D volumetric display is quite promising, since it requires no moving parts. However, the major difficulties to produce a practically useful 3D display using this approach are its scale-up capability and color capability.

Gas Medium Up-conversion

Another 3D Display based on the up-conversion concept employs the intersection of two laser beams in an atomic vapor, and subsequent omnidirectional florescence from the intersection point (U.S. Pat. No. 4,881,068, Nov. 1989). Two lasers are directed via mirrors and x-y scanners towards an enclosure containing an appropriate gaseous species (rubidium vapor, for example), where they intersect at 90 degrees. Either laser by itself causes no visible fluorescence. However, where both laser are incident on the same gas atoms, two step excitation results in florescence at the intersecting point. By scanning the intersection point faster enough, a 3D image can be drawn in the vapor. The eye can not see changes faster that about 15 Hz, so that if the image to be displayed is repeatedly drawn faster than this rate, the image will appear to be steady, even though light may be originating from any one point in the volume for only a small fraction of the time.

The advantage of this 3D display concept is its scalability: It can be built in almost any desirable size without significantly increasing the complexity of the system. The technical difficulties in implementing this concept including the requirement of a vacuum chamber, the requirement for maintaining a certain temperature, the limitation on the number of voxels due to the speed of the scanners, and concern for the safety of the eyes of viewers due to the use of laser beams.

Rotating Light Emitting Diodes (LEDs) Array

One of the earliest volumetric 3D displays was designed by Schipper (U.S. Pat. No. 3,097,261, 1963). It consists of a rotating electroluminenscent panel with an embedded high-speed light emitter array. By controlling the timing of the x-y addressing of the light emitter array and the rotation of the panel, 3D images can be formed within the volume swept by the rotating panel. In 1979, Berlin developed an innovative approach to solving the high-bandwidth data transmission problem of this design using an optical link and replaced the light emitters with a high speed LED (Light Emitter Diode) matrix (U.S. Pat. No. 4,160,973 by Berlin, 1979). This system uses a 3D array of LEDs that are rotated to sweep out a 3D volume. The resolution of this volume is a function of the number and density of LEDs mounted on the rotating planar array, the speed of rotation and the rate at which the LEDs can be pulsed.

Cathode Ray Sphere

The Cathode Ray Sphere (CRS) concept was originally developed by Ketchpel in the 1960s (U.S. Pat. No. 3,140, 415 by Ketchpel, 1960) and recently implemented by researchers in New Zealand (US Patent 5703606 12/1997 Blundell). The voxels are created by addressing a rapidly rotating phosphor-coated target screen in vacuum by electron beams synchronized to the screen's rotation. The view of this rotating multiple planar surface depends on the clarity of the glass enclosure and the translucency of the rotating screen. Another image quality issue is the interaction between the phosphor decay rate and the speed of the rotation of the screen.

Varifocal Mirror and High Speed Monitor

A very clever method of 3D display employs the strategy of forming optical virtual 3D images in space in front of a viewer using a varifocal mirror system (U.S. Pat. No. 4,130,832 by Sher, 1978). The varifocal mirror system consists of a vibrating circular mirror along with a high-speed monitor. The monitor is connected to a woofer such that the woofer can be synchronized to the monitor. A flexible, circular mirror is attached to the front of the woofer, and the monitor is pointed toward the mirror. With the vibrations from the woofer, the mirror changes focal length and the different points being displayed on the monitor seem to appear at different physical locations in space, giving the appearance of different depths to different objects in the scene being displayed. Variable mirror based 3D display systems are primarily limited by the size of the mirror and updating rate of images, since this mirror has to vibrate.

Laser Scanning Rotating Helix 3D Display

Extensive attempts have been made by researchers at Texas Instruments (U.S. Pat. Nos. 5,042,909, 5,162,787, etc.) to develop a 3D display device based on laser scanning and a rotating (helical) surface. Lasers scanning 3D displays operate by deflecting a beam of coherent light generated by a laser to a rotating helical surface. Timing modulation of the laser beam controls the height of the light spot that is produced by the laser on the rotating surface. The deflectors include devices such as polygonal mirrors, galvanometers, acousto-optics modulated deflectors, and micro-deformable mirrors. There are several problems with this 3D display mechanism that have prevented it from becoming commercially feasible.

The most serious problem is the limitation on the maximum number of voxels that can be displayed. Due to the nature of sequential (non-parallel) laser scanning, only one spot of light can be displayed at any given moment. All the activated image voxels have to be addressed, one by one, by the scanning of a single laser beam in time-multiplex fashion. The time needed for scanning the laser beam, including holding the laser on a particular voxel position long enough to produce sufficient brightness, poses an upper limit to how many voxels the device can display. To increase the number of voxels, multiple channel lasers and scanners could be used. However, many attempts to increase the spatial resolution have been hampered with high cost and bulky hardware design.

As shown in the previously mentioned patents and techniques, there has been research and development efforts for obtaining a true volumetric 3D display. However, none of them is able to provide high-resolution volumetric 3D images with over one million voxels.

BRIEF SUMMARY OF THE INVENTION

The primary objective of the present invention is to provide a simple method and apparatus to display high-resolution volumetric three-dimensional images in true three dimensional physical space so that human eyes can view the three dimensional images without using any special viewing aids. The disclosed volumetric 3D display method employs a two dimensional image generation means, such as a fast spatial light modulator (SLM), to project a sequence of two dimensional images onto the surface of a moving image screen. By controlling the timing of the image projection and the dynamic position of the moving screen, the image points (voxels) can be shown at a desirable height. The moving screen repeats its motion at a rate higher than the human eyes refreshing rate (20 Hz, for example) allowing the residuals of vast amount of image points to form volumetric 3D images to human eyes. An example of a moving screen is a rotating helix surface. Traditional volumetric 3D display methods employ laser scanning mechanisms, resulting in a poor brightness and low spatial resolution. The disclosed SLM/Helix 3D display method, in contrast, uses SLM(s) to project all image elements within the two dimensional images simultaneously to the moving screen, this greatly increases the image throughput and spatial resolution. We have successfully implemented a number of volumetric 3D display systems that possess the capability of showing over eight million voxels simultaneously in a single three dimensional image.

DETAILED DESCRIPTION OF THE INVENTION AND PREFERRED EMBODIMENTS

First Embodiment

Figure 1:
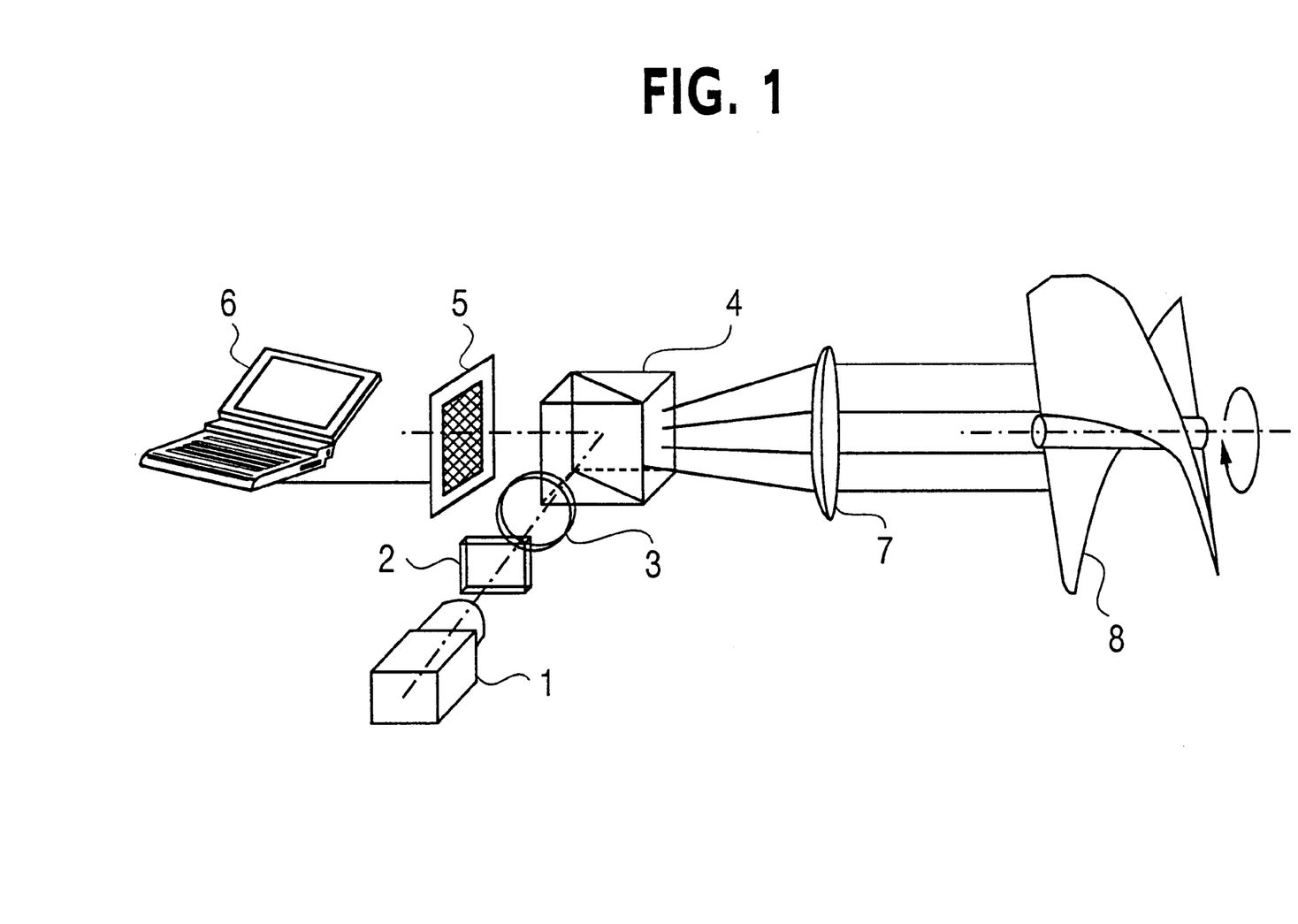
FIG. 1 shows the first embodiment of the SLM/Helix 3D display.

FIG. 1 shows the first embodiment of the SLM/Helix 3D display.

In the FIG. 1, light rays produced by a projector 1, passing through a UV and IR cut-off filter 2 and collimating lens 3, impinge on a polarizing beamsplitter cube 4. Due to the polarization characteristics of the beamsplitter, the polarized light rays are reflected by the beamsplitter and projected onto a spatial light modulator (SLM) 5. The image data shown on the SLM are generated by a host computer 6. The SLM 5 is able to alternate image patterns at a high frame rate (over 3,000 frames per second, for example). When a pixel on the SLM 5 is turned ON, the light will be reflected back to the beamsplitter cube 4, while when the pixel is turned OFF, the projected light on this pixel will be absorbed by the SLM 5 and will not be reflected. The patterns on the SLM 5 are therefore able to control the patterns of the reflected light rays. The reflected light rays encoded with the SLM image patterns transmit through the beamsplitter cube. An optical projection lens system 7 is employed to project the image patterns towards a spinning helix screen, marked as 8. The light spots projected on the helix screen 8 intersect the helix surface at different heights depending on the different rotating angle of the helix, thus forming 3D voxels in 3D space. Each section of the helix surface can be described by the following mathematical equations:

$$y = x \tan\gamma, z = \frac{H\gamma}{180} = p\gamma, \gamma \in [0, 180°], x \in [0, R].$$

If we synchronize the rotating motion of the helix screen with the pattern switching timing of the SLM, such that 3D image patterns are shown in the 3D space with a high refresh rate (over 20 Hz for example), human eyes perceive them as true 3D volumetric images. Viewing such images requires no special eyewear. The 3D image is floating in true 3D space, just as if the real object were placed there.

Advantages of the proposed SLM/Helix 3D display system include:

- Inherent parallel architecture for voxel-addressing: Instead of using single a laser beam to address all the voxels (such as prior art of scanning laser helix system), the SLM/Helix system use a two dimensional array of light rays (256 by 256 rays, for example) to simultaneously address 3D voxels, thus overcomes the bottleneck in producing high resolution, 3D images using other approaches.
- High Spatial Resolution: The maximum number of voxels that can be generated by the SLM/Helix display depends upon the spatial resolution of SLM and the spinning speed of the helix screen. With currently available SLM technology, SLM devices with a resolution of 1024 by 1024 pixel and frame rate of 300,000 frames per second are on the market. Therefore a 3D display device with over one-million voxels is practically implementable.
- Simple structure and easy to build. There is no mechanical scanning or complex timing related problem in the SLM/helix design. The optical alignment is not difficult to implement.
- No viewing glasses or helmet is needed by viewers: The volumetric images are displayed in true 3D space with all-around viewing angle, which preserves physiological and psychological depth cues for the human visual system. Viewers can walk freely around the monitor to see the 3D images, just as if the real 3D object were sitting there.
- Implementation of full color display is straightforward: Use three SLMs for Red, Green, and Blue respectively, and the color of voxels can be automatically controlled. Another way to implement color display is even simpler: use Red, Green and Blue light projector, and synchronize the timing of three projectors with a high speed SLM.

Second Embodiment: Portable 3D Display Design

From the viewpoint of optical projection, the overall system configuration shown in FIG. 1 is a "front projection system (FPS)". This means that images are projected onto the rotating helix surface from the same side as viewers view the 3D images. The front projection design of a 3D display makes it easier to implement the motion control for the rotating helix. It also provides convenience in adjusting optical system setups and modifying other components or subsystems.

Figure 2:
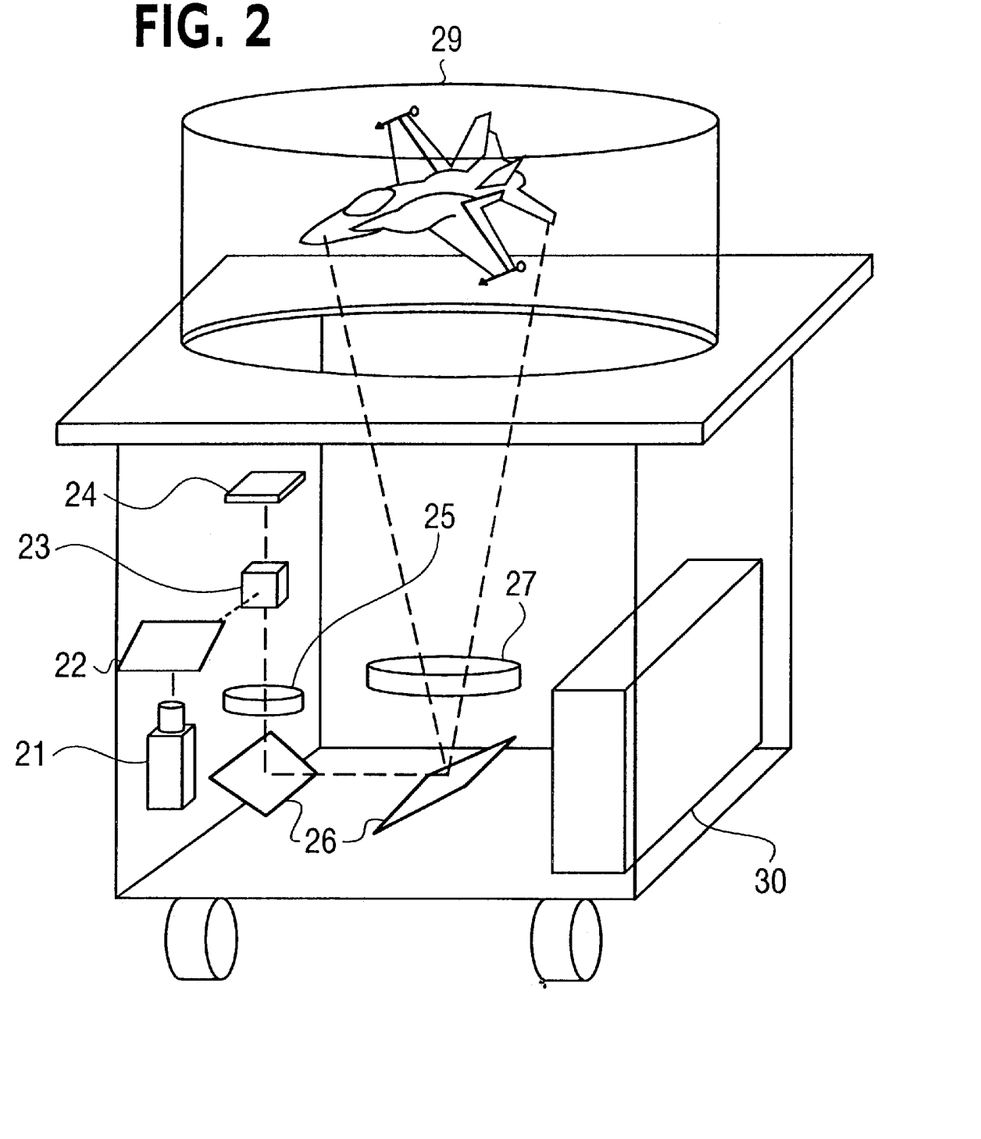
FIG. 2 shows an embodiment of the Portable Volumetric 3D Display Unit and Optics Layout with the rear projection system configuration.

The second embodiment of this invention disclosed herein adopts a "rear projection system (RPS)" design configuration. In an RPS configuration, image patterns are projected onto the rotating helix screen from below, while viewers view 3D images from above, as shown in FIG. 2. The helix surface is made of semi-transparent material so that it transmits 50% light and reflects 50% light. Therefore it can diffuse the light spots projected by the image projector to form voxels that can be viewed from both sides of the helix surface (i.e., from virtually omnidirections).

A major advantage of using the RPS configuration is that it is possible to achieve a compact system design. All the components of the SLM/Helix 3D display system can be packaged into a cabinet with the 3D display volume on the top. From the viewpoint of commercial product design, RPS may be a much better system design configuration for a volumetric 3D display device.

Third Embodiment: VCSEL

Since 1989, low-threshold vertical cavity surface-emitting lasers (VCSELs) have generated much excitement as active sources for fiber optic communication and optical disk storage. VCSELs are large arrays of miniature lasers that emit light vertically from the semiconductor surface. Each laser can be individually addressed and modulated at very high rates (GHz range). A 8×8 VCSEL array has been introduced to the market (see J. Jewell and G. Olbright, "Arrays of Vertical Cavity Surface-Emitting Lasers Go Commercial," Optics & Photonics News, Vol. 5, No. 3, March 1993, p8–11). Large arrays on the order of 512 by 512 can be envisioned. This technology is exciting as a compact, parallel light source for display applications.

Figure 3:
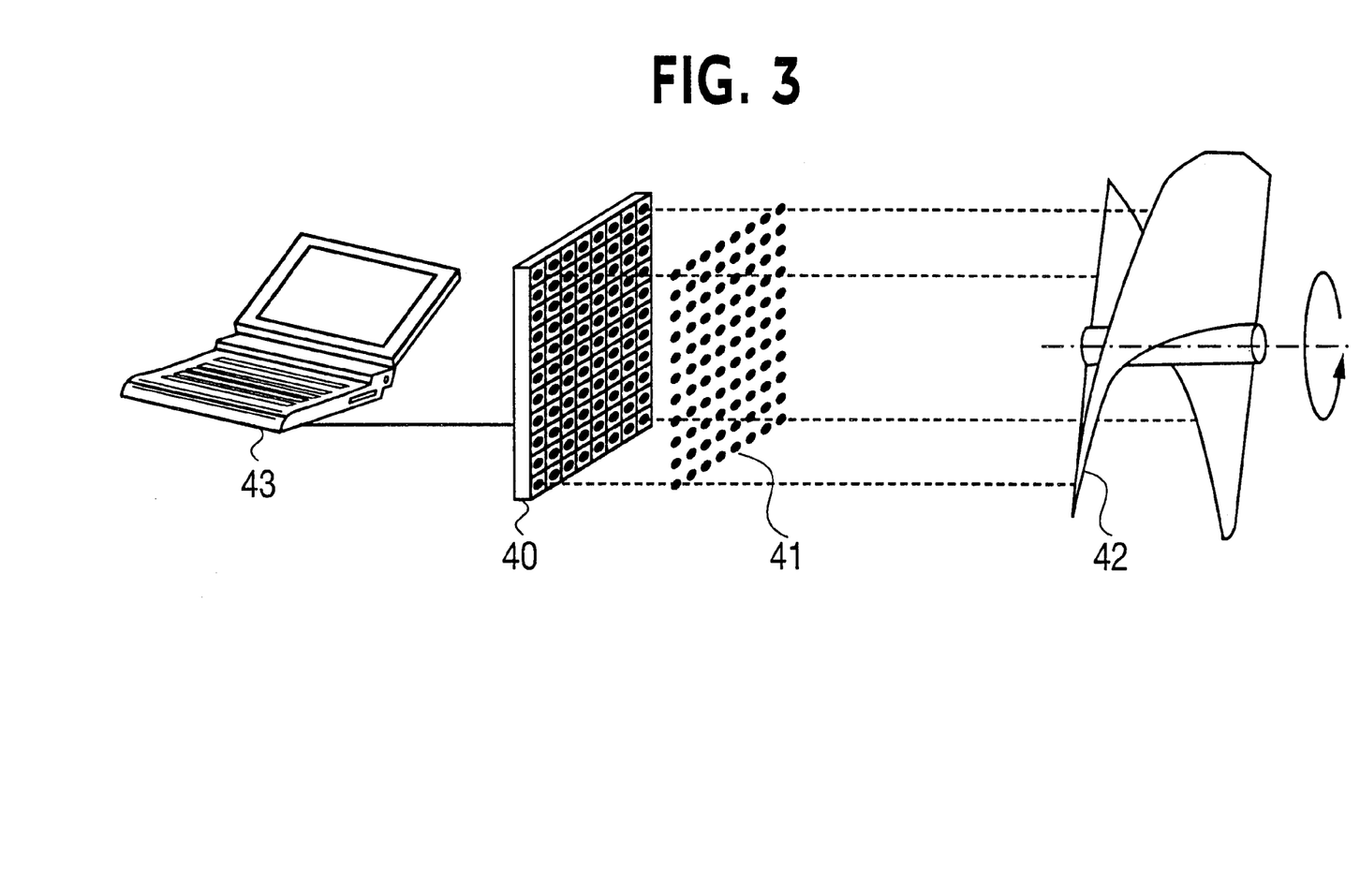
FIG. 3 shows an embodiment of the Volumetric Three Dimensional Display Using Vertical Cavity Surface Emitting Laser Array.

FIG. 3 illustrates a VCSEL/Helix system architecture of a volumetric 3D display device that employ 2D arrays of the vertical cavity surface emitting lasers. Each individual emitter in the 2D VCSEL array is independently addressable, and can be modulated at high frequency (up to giga-Hz). The two-dimensional VCSEL array 40 is configured as either a front projection configuration (FPC) as shown in FIG. 3, or a back projection configuration similar to that of FIG. 2. A microlens array 41 is used to focus the laser beams produced by the VCSEL array to produce sharp images on a rotating helix 42. The images to be shown are pre-processed and loaded from a host computer or processor 43 which control the timing in modulating the intensity of the light ray projection that generates the volumetric 3D images. The VCSEL can be operated in a continuous (CW) mode or in pulsed mode. Since the VCSELs can be grown in high density on semiconductor chips, the VCSEL/Helix design has the potential of producing a very high spatial resolution for volumetric 3D display. Additionally, VCSELs can be grown in micro-clusters of different wavelengths allowing wavelength multiplexed addressing to be incorporated in this system to produce desirable color display.

Color 3D Display Schemes

Approach 1: Multi-color 3D Display Design Using Multiple SLMs.

Figure 4:
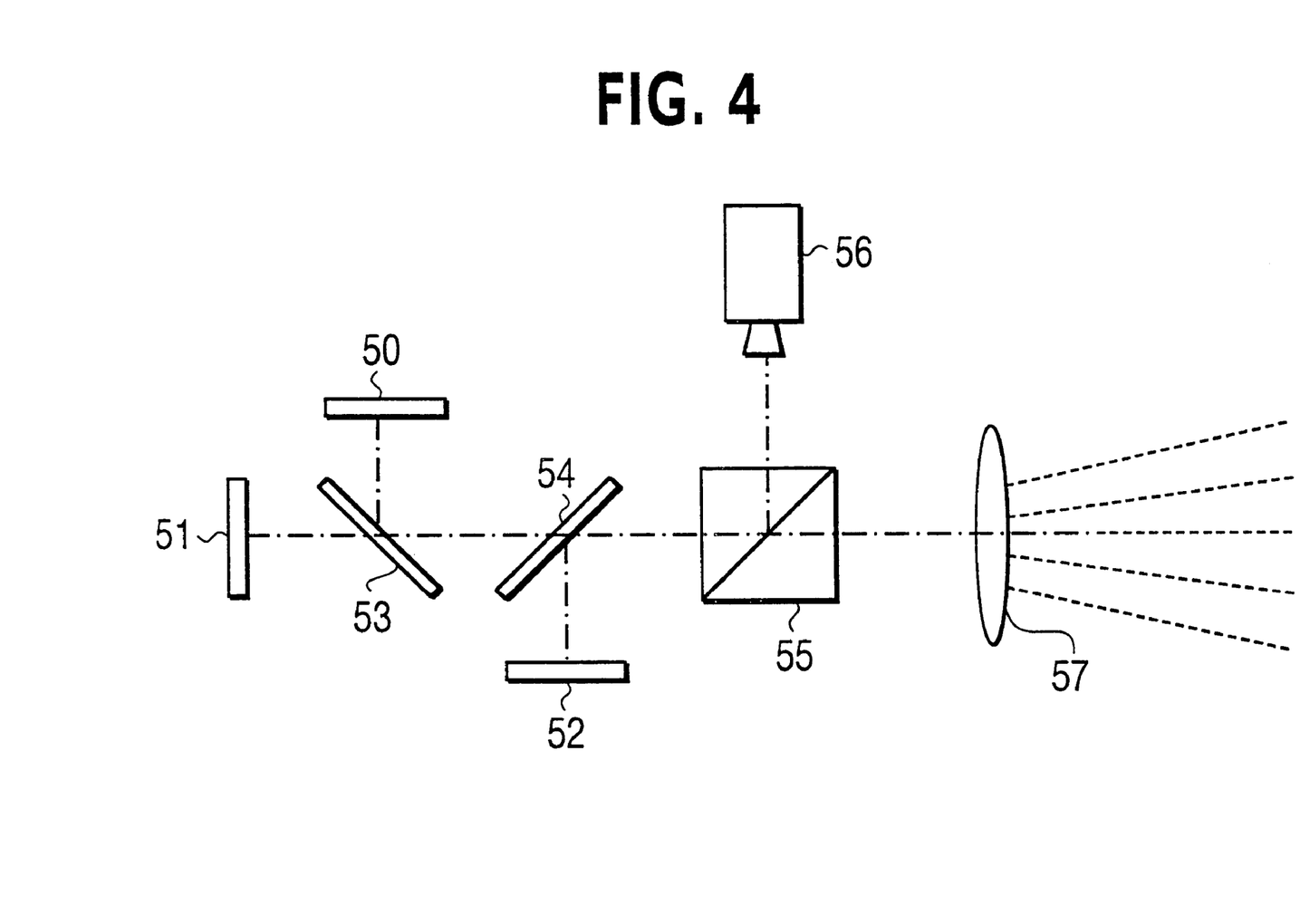
FIG. 4 presents a color combination scheme of the disclosed multi-color SLM/Helix 3D display employing multiple SLM projection modulars.

FIG. 4 depicts a method of producing multi-colors for the SLM/Helix 3D display using multiple SLMs. The color combination scheme employs three separate SLMs, each for a primary color (Red, Green and Blue, for example). The full color 3D image is first decomposed into three images, each with a single color component (R, G, B). These three images are sent to three SLMs 50, 51, 52 respectively to form a combined color projection through two dichronic filters 53, 54. The light illumination generated by a white light projector 56 is reflected by a polarized cube beamsplitter 55. A "Blue reflector" filter -54- is placed in the light path to reflect the light energy in the "Blue" region toward the Blue SLM. The blue image pattern produced by the Blue SLM is in turn reflected back by the blue reflector to the projection lens system. The light energy passing through the Blue Reflector continues its propagation along the light path. The "Red" region of light is reflected by a "Red Reflector" 53. The Red image pattern is then produced by the Red SLM in a similar manner as that of Blue channel. The remaining light energy, mainly in the "Green" region, will be processed by the Green SLM. All three colored images (i.e., R,G,B) are aligned and projected in synchronization to each other as a color image pattern by single projection lens system 57. A multi-color 3D image display is then created on the rotating helix surface placed in the projection field.

Approach 2: Multi-color 3D Display Design Using Multiple Color Light Sources.

The second approach to implement a multiple color 3D display employs multiple light sources with different primary colors. As shown in the FIG. 5, we use three monochromic light sources (lasers, LEDs, or white light projectors, for example) to produce Red, Green and Blue illumination. If high bandwidth laser sources are used, then the ON/OFF of each light source is controlled by electronics through laser power directly. If other types of light sources with no high frequency switching capability are used, then a set of high-speed shutters 68 will be employed to control the light projection from each color channel. An optical mirror/beamsplitter system 63 is used to combine three color projections into a single beam, and steer it toward the polarizing beamsplitter cube 65.

Figure 5:
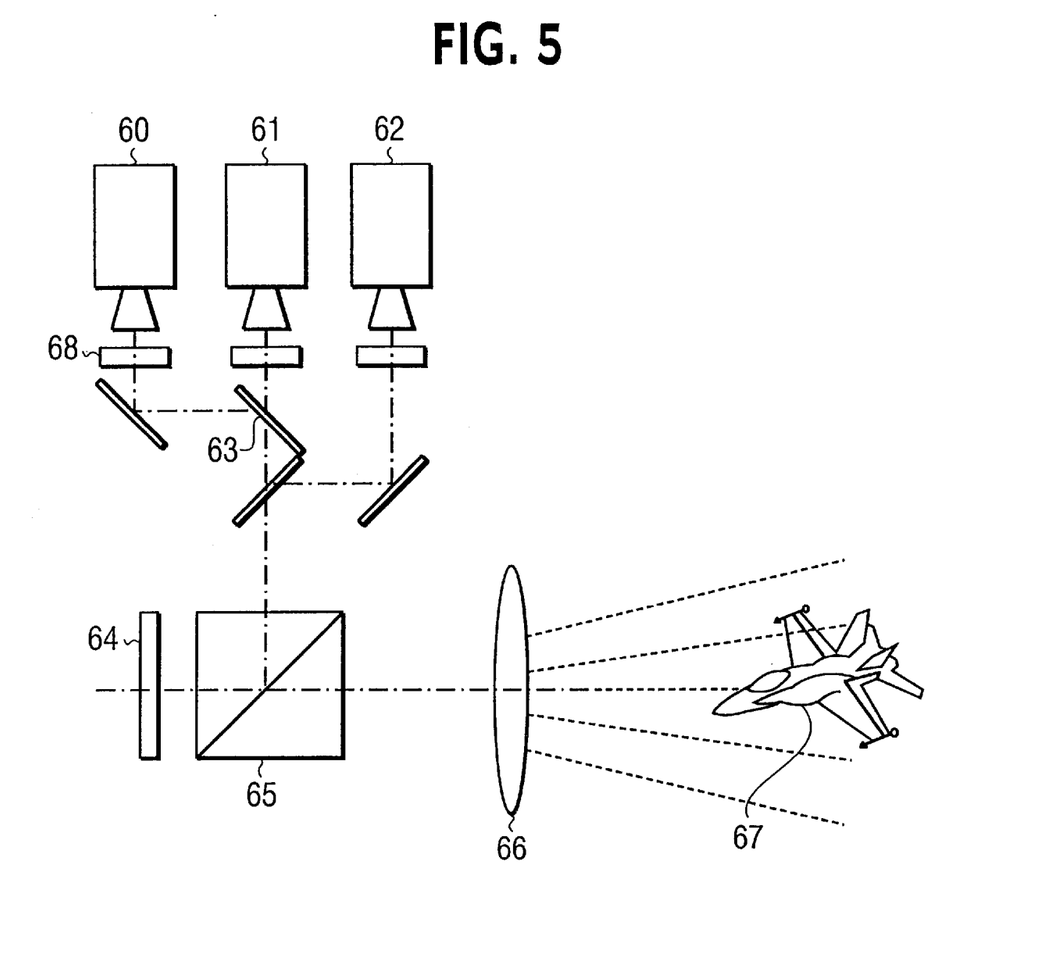
FIG. 5 shows another color combination scheme of the disclosed multi-color SLM/Helix 3D display employing multiple color light sources.

The SLM 64 in this case needs to be refreshed at a rate three times higher than the refreshing rate of the 3D image. The decomposed R, G, and B images are written to the SLM successively, with synchronization to the R, G, and B light projectors. This "time-multiplexing" color scheme allows us to generate color 3D volumetric images using only one SLM. However, the refreshing rate of both the SLM and light sources needs to be three times higher than that of the 3D images. The combined color image patterns are projected through projection lens system 66 to form 3D images 67 on the rotating helix surface.

Spatial Light Modulator

Spatial Light Modulators (SLM) are devices that alter the temporal and spatial character of a light beam. The SLM can be either optically or electrically addressed. Optically addressed SLMs often require bulky support equipment and additional light sources. The image pattern on the devices decays, thus the new image may be overlaid with a residual prior image. In contrast, electrically addressed SLMs are compact and can operate at high speeds approaching 10,000 frames per second.

Currently, two viable electrically addressed two dimensional SLM technologies are (1) deformable mirror devices (DMD), and (2) fast liquid crystal devices (FLCD).

The deformable mirror devices, developed by Texas Instruments, are new optomechanical micromirror arrays for use in large-screen television projection systems. This type of device is built on a small 2.3 square centimeter chip containing an array of 678×576 tiltable micromirrors (each 16×16 $\mu$m in size). Each mirror can be tilted into one of two positions (+10 or −10 degrees) by electrostatic forces, allowing for light on/off operation. Light reflected from the full array yields a spatially modulated 1-bit image plane. The current devices address a standard VGA format image (640×480 pixels) at a rate of 60 1-bit VGA images per $\frac{1}{60}^{th}$ of a second. A 1-bit picture plane can be read into a standard digital micromirror device in about 140 $\mu$s (i.e., single frame time).

Figure 6:
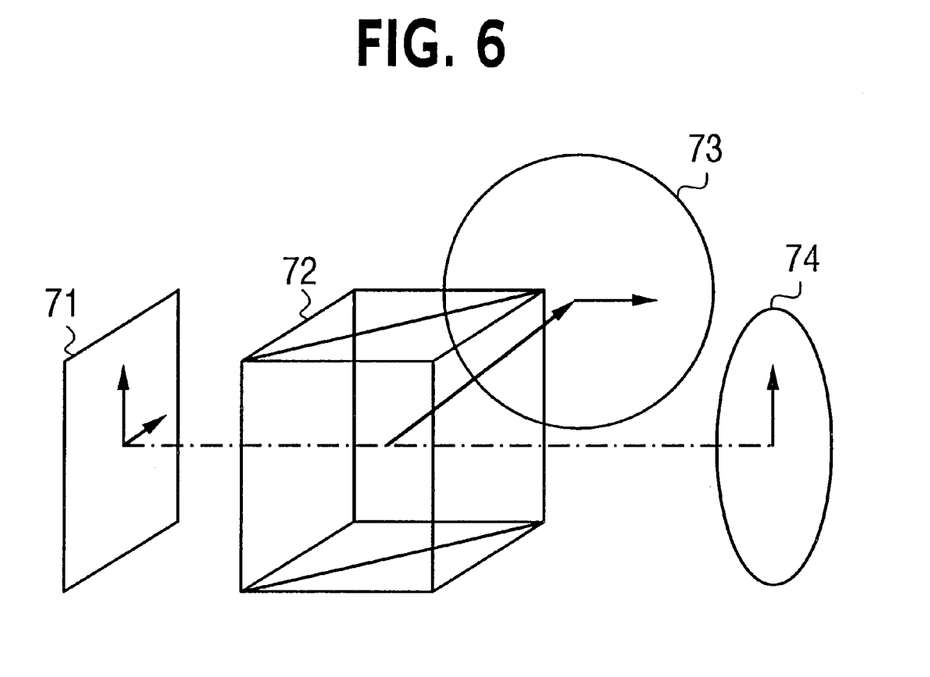
FIG. 6 shows a high contrast amplitude modulation system configuration using fast ferroelectric SLM device.

We propose to use the fast ferroelectric liquid crystal (FLC) reflective spatial light modulator. The device is built atop a planarized 0.6 mm CMOS SRAM backplane with 15 mm pixel pitch and 87% fill factor. A thin layer of FLC material is sandwiched between a metal conductor and a glass window coated with a t sparent conductive layer such as indium tin oxide (ITO). When a voltage is applied across the FLC layer the fast axis of the birefringent FLC material is forced into one of two possible states. FIG. 6 shows a system configuration of a high contrast amplitude modulation device using an SLM. There are two polarizers in the system, one to polarize the incoming light (74), and the other to analyze the outgoing light (73). The beamsplitter (72) is necessary in order to separate the input and output beams. The polarization direction of the analyzer is set acrossed to the polarizer, so that the "off" state on the system corresponds to the FLC device (71) state in which the light is unchanged upon passing through the FLC cell. In the "off" state, the fast axis of the FLC material is parallel to the transmission axis of a linear polarizer, and the incident light is reflected off the FLC cell unchanged. thus blocked by the analyzer. When the FLC is electrically switched to the "on" state, the polarization vector of the incident light is rotated 90 degree upon reflection from the FLC cell, and passed through the analyzer.

The device achieves better than 25% optical throughput when used with collimated laser light and better than 100:1 contrast ratio when oriented for amplitude modulation. The device can be operated as fast as 5 kHZ with complete switching of the liquid crystal. The spatial resolution of current SLM products ranges from 256×256 to 1024 by 1024 pixels.

The SLM/Helix 3D Display Algorithm and Software Development

From a functionality point of view, the SLM/HELIX 3D display software consists of four modules:

(1) 3D data preparation and scheduling;

(2) Real-time control of SLM projection based on the prepared 3D image data;

Assume the 3D display volume has L voxels along the X axis, M voxels along the Y axis and N voxels along the Z axis. The spatial resolution is the L (X) by M (Y) by N (Z) voxels. We now discuss two function modules of our 3D display software/algorithms.

Module 1: 3D data preparation and scheduling

Figure 7:
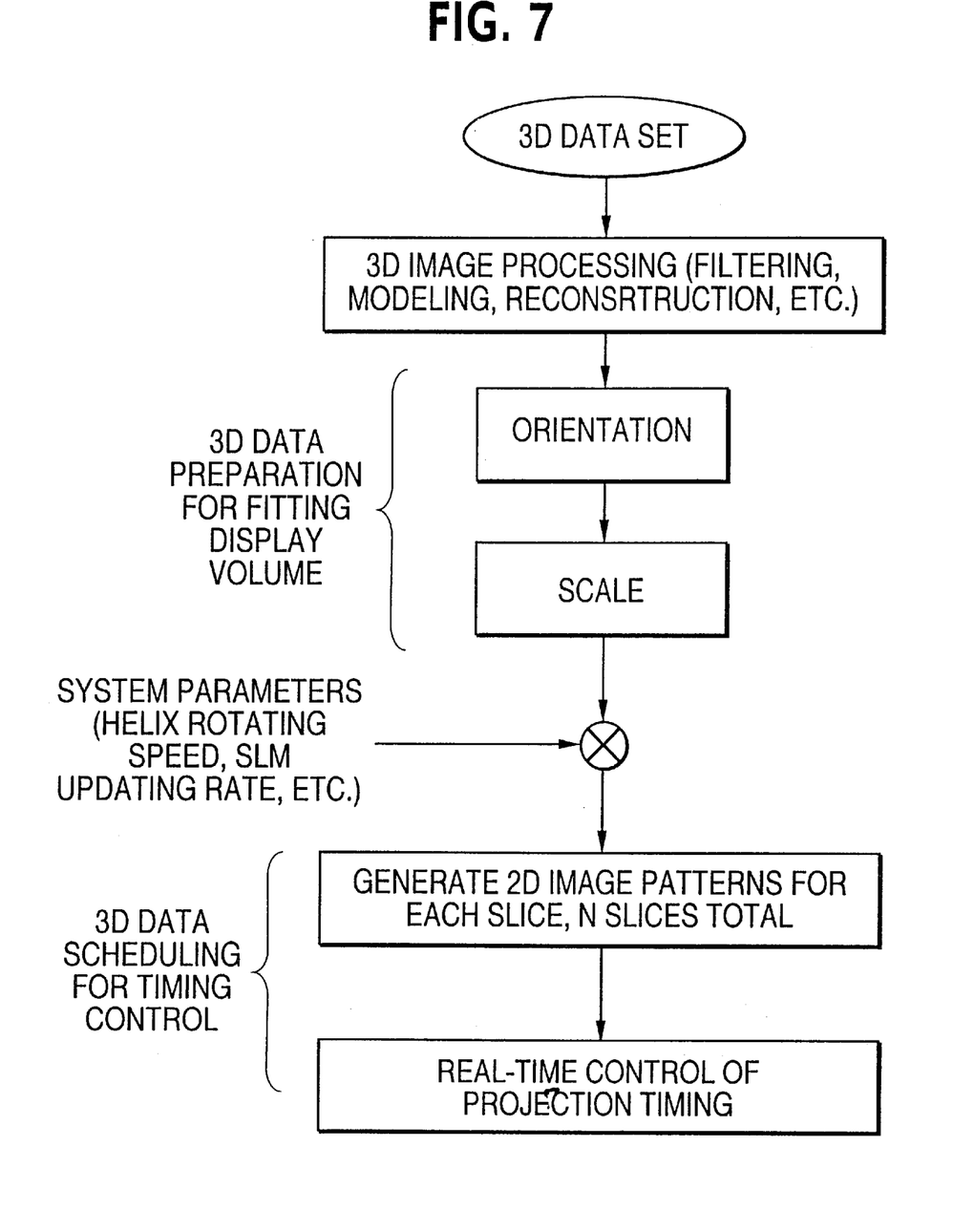
FIG. 7 shows a flow chart of a 3D Display Algorithm (3D Data Preparation and Scheduling).

FIG. 7 depicts a flow chart of the data preparation and scheduling algorithms in our SLM/Helix 3D display system. Each step is elaborated below:

(1) 3-D data preparation:

Perform mathematical transformations, such as scale, rotation, and translation, for original 3D data set so that the displayed 3D image fits into the 3D display volume. For example, if a 100 feet long Jet Plane is to be displayed in a 5" long display volume, the scaling algorithm will find a scaling factor [5/(100*12)] and use this factor to scale-down the 3D data set that describes the 3D surface profile of the Jet Plane.

Proper display orientation can also be selected and a simple homogeneous transformation can convert the scaled data into a desired orientation.

Figure 8:
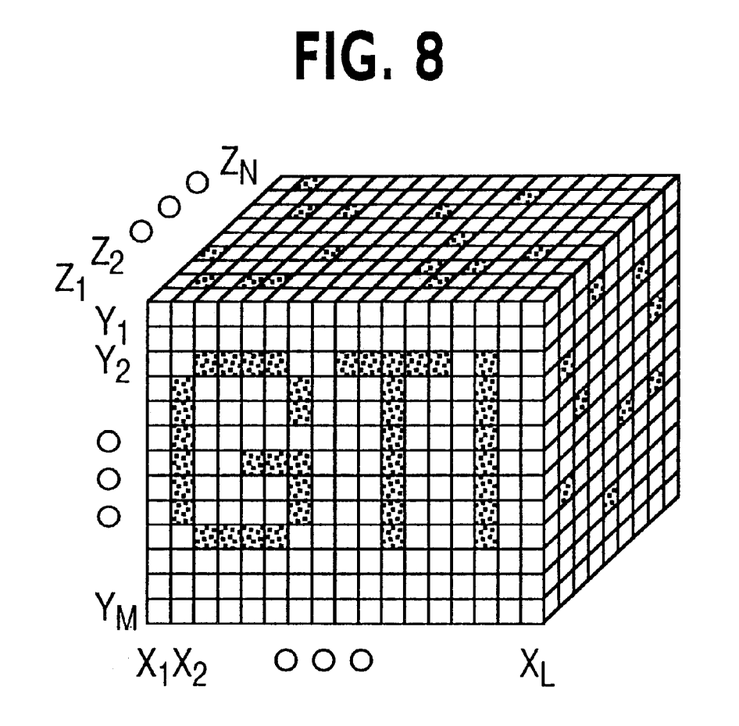
FIG. 8 shows a partition of a 3D Data Set into N Helical Slices.

(2) Slicing the 3D display volume:

With the scaled and oriented 3D data set, the algorithm then slices the 3D volume into N "slices" of volume along the Z axis. Each slice has a shape of a helix surface. The task of displaying 3D images in true 3D volume is thus converted into N tasks of 2D display image projection tasks on an X-Y plane. The 2D image projection sequence is produced by a high-speed SLM. We can visualize the 3D data as a 3D cube, as shown in FIG. 8. The 3D volume can be divided into N parts, and each part represents a "helical slice" of the 3D display volume. Associated with the 3D scanning cube, there is another 3D gray-scale cube that stores the voxel intensity values for each cell in the 3D scanning cube.

In order to efficiently store the data in the 3D scanning cube, data compression methods (such as link-list method) have been investigated that allows us to store only the activated voxels. Since in normal 3D images the activated voxels has small percentages (say 5%), the data compression method can save significant memory and increase system's speed.

Module 2: Real-time control of SLM projection based on the prepared 3D helical slices.

Figure 9:
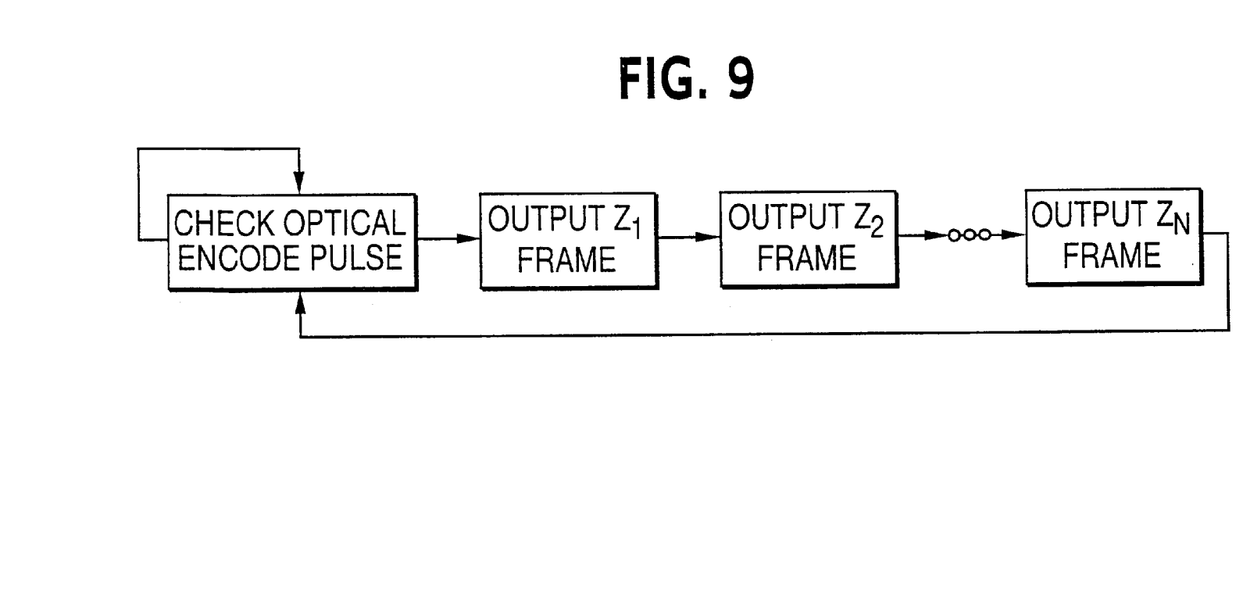
FIG. 9 shows a flow chart of a Real-time 3D Display Process.

A real-time control program has to be implemented that detects the trigger signal from the optical encoder, and sends control signals to the laser divide array to refresh 3D image based on the prepared data in the 3D helical slices. FIG. 9 illustrates the flow chart of our real-time 3D display algorithm.

After proper initialization, the host computer keeps checking the signal from an angular position sensor (an optical encoder) co-axially mounted on the shaft of helix surface. The optical encode provides a trigger signal every time the leading edge of any helix surface passes the initial angular position. Once the pulse from the encoder is detected, the host computer controls the SLM to start repetitive projection of 2D image patterns. Each projection produces a "layer" of light spots in the 3D volume. After N projections, the host computer goes back to wait for the trigger signal from the next helix surface, after it completes N scans. This 3D image refreshing cycle repeats at a high updating rate (20 Hz, for example) so that naked human eyes can no longer perceive the helix surface, but rather floating light spots in true 3D space.

The foregoing description is offered for illustrative purpose only. Numerous modifications and variations maybe readily apparent to those skilled in the art, while still falling within the spirit and scope of the invention as claimed below.

The invention claimed is:

1. An improved high resolution volumetric 3D display system utilizing a separately developed 3D image data set, wherein said 3D image data set represents a 360 degree view of the object or objects to be displayed, the display system comprising:

processor means for receiving said 3D image data set and for generating 2D helical-shaped slices of said 3D image data set about a central vertical axis of said 3D image data set;

light modulator means having a flat 2D imaging surface driven by said processor means for successively imaging said 2D helical-shaped slices of said 3D image data set at a rate faster than a refresh rate of a human eye;

light source means for illuminating said imaging surface of said modulator means as successive 2D images are displayed;

a rotating helical display screen the shape of which corresponds to that of said 2D helical-shaped slices of said 3D image data set, wherein rotation of said screen is synchronized with said successive imaging of said 2D helical-shaped slices on said modulator means; and optical projection means for projecting light from said light source means, which has been modulated by said light modulator means according to said sequence of 2D images, to said rotating helical display screen such that a 3D image is generated in a space through which said screen rotates.

2. The 3D display system of claim 1, wherein said optical projection means further comprise a beam splitter, said beam splitter being optically coupled between said light source means, said light modulator means and said rotating screen such that light from said light source means is directed by said beam splitter to said surface of said light modulator means, and light reflected by said light modulator means is transmitted by said beam splitter to said rotating screen.

3. The 3D display system of claim 1, wherein said light modulated by said light modulator means is projected by said optical projection means to said rotating screen along a direction parallel to an axis of rotation of said rotating screen.

4. The 3D display system of claim 1, wherein said 3D image comprises at least one million voxels.

5. The 3D display system of claim 1, wherein said light modulator means comprises ferroelectric liquid crystal spatial modulator array means for creating the succession of 2D images.

6. The 3D display system of claim 1, wherein said light source means comprise three separate light source means each providing light of a different color such that said 3D image displayed on said rotating helical display screen is in color.

7. The 3D display system of claim 1, wherein said light modulator means comprise three separate light modulator means each of which modulates said 2D slices of said 3D image set with respect to a different color such that said 3D image displayed on said rotating helical display screen is in color.

8. An improved method of providing a high resolution volumetric 3D display utilizing a separately developed 3D image data set, wherein said 3D image data set represents a 360 degree view of the object or objects to be displayed, the method comprising:

generating 2D helical-shaped slices of said 3D image data set about a central vertical axis of said 3D image data set;

successively imaging said 2D helical-shaped slices of said 3D image data set on a spatial light modulator having a flat 2D imaging surface at a rate faster than a refresh rate of the human eye;

illuminating said imaging surface of said modulator as successive 2D images are displayed;

projecting light, which has been modulated by said light modulator according to said sequence of 2D images, to a rotating helical display screen the shape of which corresponds to that of said 2D helical-shaped slices of said 3D image data set, wherein rotation of said screen is synchronized with said successive imaging of said 2D helical-shaped slices on said modulator such that a 3D image is generated in a space through which said screen rotates, said 3D image being either symmetrical or asymmetrical and being viewable from any angle along a 360 degree perimeter around said rotating screen without the use of any view aid.

9. The method of claim 8, further comprising directing light, with a beam splitter, from a light source to said surface of said light modulator and transmitting light reflected by said light modulator through said beam splitter to said rotating screen.

10. The method of claim 8, wherein projecting said light modulated by said light modulator comprises projecting said light modulated by said light modulator to said rotating screen along a direction parallel to an axis of rotation of said rotating screen.

11. The method of claim 8, wherein said 3D image comprises at least one million voxels.

12. The method of claim 8 wherein said light modulator comprises ferroelectric liquid crystal spatial modulator array for creating the succession of 2D images.

13. The method of claim 8 wherein said illuminating comprises illuminating said imaging surface with three separate light sources each providing light of a different color such that said 3D image displayed on said rotating helical display screen is in color.

14. The method of claim 8 wherein said successively imaging said 2D slices of said 3D image data set on a light modulator comprises imaging a different color component of each of said 2D slices of said 3D image data set on one of three separate light modulators such that said 3D image displayed on said rotating helical display screen is in color.

15. An improved high resolution volumetric 3D display system utilizing a separately developed 3D image data set, wherein said 3D image data set represents a 360 degree view of the object or objects to be displayed, the display system comprising:

a processor for sequencing 2D slices of said 3D image data set, said 2D slices having a curved surface within said 3D image data set and each 2D slice including a central vertical axis of said 3D image data set;

a light modulator having a flat 2D imaging surface driven by said processor for successively imaging said 2D slices of said 3D image data set at a rate faster than a refresh rate of a human eye;

a light source for illuminating said imaging surface of said modulator as successive 2D images are displayed;

a rotating, curved display screen the shape of which corresponds to that of said curved-surface 2D slices of said 3D image data set, wherein rotation of said screen is synchronized with said successive imaging of said 2D slices on said modulator; and an optical projection system for projecting light from said light source, which has been modulated by said light modulator according to said sequence of 2D images, to said rotating display screen such that a 3D image is generated in a space through which said screen rotates, said 3D image being viewable from any angle along a 360 degree perimeter around said rotating screen without the use of any view aid.

16. The 3D display system of claim 15, wherein said optical projection system further comprises a beam splitter, said beam splitter being optically coupled between said light source, said light modulator and said rotating screen such that light from said light source is directed by said beam splitter to said surface of said light modulator, and light reflected by said light modulator is transmitted by said beam splitter to said rotating screen.

17. The 3D display system of claim 15, wherein said light modulated by said light modulator is projected by said optical projection system to said rotating screen along a direction parallel to an axis of rotation of said rotating screen.

18. The 3D display system of claim 15, wherein said 3D image comprises at least one million voxels.

19. The 3D display system of claim 15, wherein said light modulator comprises a ferroelectric liquid crystal spatial modulator array for creating the succession of 2D images.

20. The 3D display system of claim 15, wherein said light source comprises three separate light sources each providing light of a different color such that said 3D image displayed on said rotating display screen is in color.

21. The 3D display system of claim 15, wherein said light modulator comprises three separate light modulators each of which modulates said 2D slices of said 3D image set with respect to a different color such that said 3D image displayed on said rotating display screen is in color.

22. The 3D display system of claim 1, wherein said optical projection means further comprises means to redirect said modulated light being projected to said display screen so as to provide a rear projection-type display.

* * * * *